July 31, 1956  W. D. HALL  2,756,594
THERMAL FLUID FLOW INSTRUMENTS
Filed Dec. 20, 1950
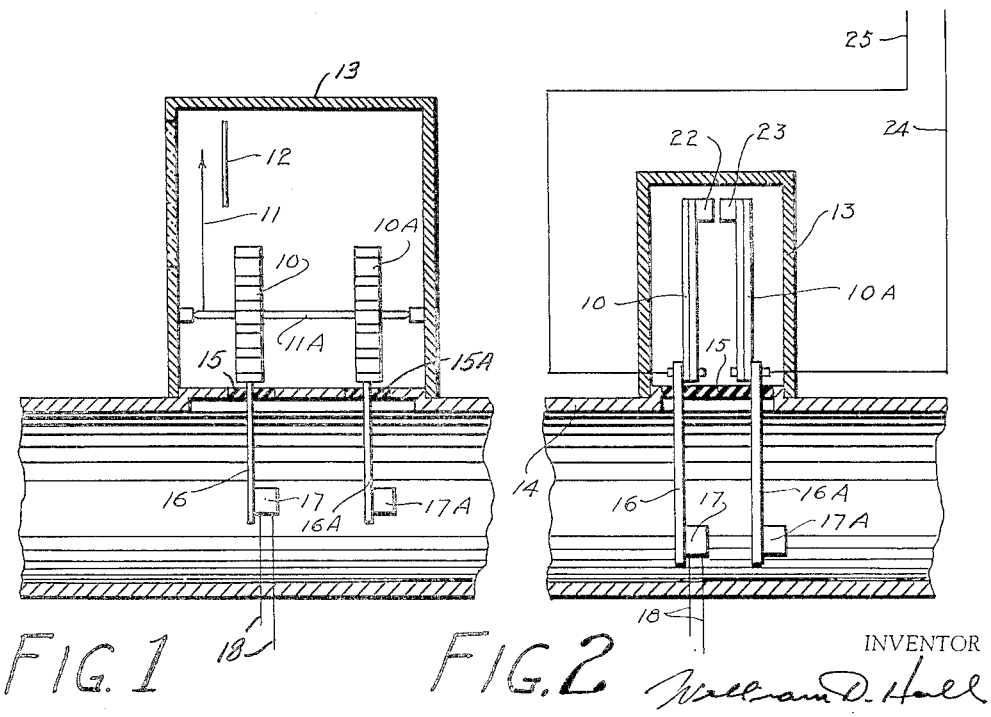
INVENTOR
William D. Hall United States Patent Office 2,756,594
Patented July 31, 1956

2,756,594

THERMAL FLUID FLOW INSTRUMENTS

William D. Hall, Washington, D. C.

Application December 20, 1950, Serial No. 201,798

4 Claims. (Cl. 73—204)

This invention relates to instruments that respond to the velocity of fluid flow and has for its primary object the provision of such an instrument with improved characteristics. Another object of the invention is to provide an instrument responsive to fluid flow which has no moving parts in the path of flow. Another object is to provide a very rugged instrument of perpetual accuracy.

My prior United States Patents 2,225,941 of December 24, 1940 entitled Condition Responsive Device, and 2,300,418 of November 3, 1942 entitled Control Device, illustrate fluid flow instruments in which the draft-responsive element is a heated bimetallic strip located in the path of fluid flow. The present invention provides a much more rugged instrument than is shown in these prior patents. Of course, the ruggedness of the devices of these earlier patents could be increased by making the elements heavier, but this would involve a serious loss of sensitivity. The present invention provides a rugged and sensitive instrument. Moreover, the present invention has improved thermal characteristics, for certain conditions of operation, as will be seen below.

The invention contemplates a pair of bimetallic strips (or other thermally responsive expansible members) located outside the path of fluid flow (usually air), preferably in a casing. These strips have heat conducing strips attached to them and extending into the path of flow. A heater which is preferably in the path of flow (but may be outside of it if the heat from the heater passes through a portion of a heat conducting strip that is exposed to the fluid flow before the heat reaches the bimetallic strip) is attached to one of the heat conducting strips so that the heat from the heater must flow along a portion of that strip before reaching its complementary bimetallic strip. In this way there is a temperature differential between the bimetallic strips which varies according to variations in the rate of flow. The differential in the deflections of the bimetallic strips may be utilized in any way such as to give an indication (e. g. a measuring instrument), operate electrical contacts, etc. By virtue of the invention the indicating means, contacts, or the like, are located outside the path of flow and therefore are not affected adversely by the composition of the fluid being measured.

This application is a continuation in part of my prior copending application Serial No. 497,487 filed August 5, 1943 entitled, Control Device Responsive to Fluid Flow, now abandoned.

Figure 1 is a cross section of one form of instrument embodying the invention.

Figure 2 is a cross section of a modified form of the invention.

In Figure 1, the instrument is compensated for ambient temperature by employing two bimetallic spirals 10 and 10A which exert opposing torques on their common shaft 11A in response to a given variation of ambient temperature. In order to compensate for temperature variations of the fluid, the coil 10A has a strip 16A which passes through bushing 15A, and carries dummy heater 17A. Dummy heater 17A should be about the same size as, and of material of the same specific heat as, heater 17. The parts 10A, 15A, 16A and 17A should have the same relative positions, dimensions, and heat conducting characteristics as their complementary parts 10, 15, 16 and 17.

There will be a temperature differential between the two bimetallic strips 10 and 10A that will decrease as the fluid velocity increases and this differential will be indicated by pointer 11 on scale 12. Wires 18 preferably supply a predetermined constant potential to heater (resistor) 17. Heater 17 preferably heats strip 16 by conduction although heating by convection or radiation is feasible. The exact mode of heat transfer between heater 17 and strip 16 is not of primary importance.

In Figure 2, the fluid flows in a pipe 14. The pipe has an insulating bushing 15 which forms part of the enclosure 13 which as in the other figures completely prevents drafts to flow across the bimetallic elements. If desired, casing 13 may be evacuated. In Figure 4 the parallel bimetallic strips 10 and 10A carry complementary contacts 22 and 23 which are moved by their respective supporting strips 10 and 10A in the same relative direction when the ambient temperature changes; hence there is no change in indication. However, when strip 10 is moved to the right due to heat from heater 17, it will effect closure of the contacts 22 and 23. If there is a strong fluid flow in pipe 14, the contacts 22 and 23 will remain open, but if the fluid flow is of only a low velocity the contacts 22 and 23 will engage thus closing the circuit through wires 24 and 25.

In Figure 1, the instrument may have different ranges of indication. To do this, the instrument is calibrated for several different potentials across wires 18, and when it is desired to operate on any particular range, the proper potential for that range is applied and held across wires 18. In Figure 2 the fluid velocity at which the contacts will open can be controlled by varying the potential across wires 18.

I claim to have invented:

1. In a device responsive to the velocity of moving fluid, a heater, means supporting said heater in the path of moving fluid to which response is desired, first and second bimetallic strips, means responsive to the differential deflection of the strips, means separating the first strip from the moving fluid to which response is desired, and a heat conductor including a first portion in the path of said moving fluid and in contact with said heater and a second portion outside the path of said moving fluid and in thermal contact with said first strip, said second strip being spaced from said first strip and from said heat conductor and being responsive to the temperature of said moving fluid.

2. In a device responsive to the velocity of fluid flow, first and second adjacent similar elements, each of which elements include means to effect expansion thereof when heated and contraction thereof when cooled, a common casing enclosing both elements and isolating them from all fluid flow, a first metallic member having a first portion outside of the casing and a second portion in thermal contact with the first of said elements, a second metallic member having a first portion outside of the casing and a second portion in thermal contact with the second of said elements, said first element and said first metallic member being spaced from the second element and from the second metallic member, at least a part of each of the first portions of said members being exposed to the moving fluid to which response is desired, a heater in good thermal contact with at least a part of the first portion of the first metallic member and spaced from the first portion of the second metallic member, and means responsive to the differential deflections of said elements.

3. The device defined in claim 2 in which said heater and said metallic members are rigid and are composed of material that is immovable under operating conditions, whereby there are no moving parts in the path of fluid flow.

4. The device defined in claim 2 in which the first portion of the first metallic member includes a section exposed to the flowing fluid which section is located between the heater and the second portion of the first metallic member.

References Cited in the file of this patent

UNITED STATES PATENTS

| | | |
|---|---|---|
| 430,271 | Cooper | June 17, 1890 |
| 1,156,638 | Simmons | Oct. 12, 1915 |
| 1,652,838 | Rider | Dec. 13, 1927 |
| 1,712,692 | Dalrymple | May 14, 1929 |
| 1,766,149 | Sawyer | June 24, 1930 |
| 1,807,376 | Braden | May 26, 1931 |
| 2,022,440 | Slough | Nov. 26, 1935 |
| 2,208,760 | Hartig | July 23, 1940 |
| 2,282,197 | Maynard | May 5, 1942 |
| 2,300,418 | Hall | Nov. 3, 1942 |
| 2,349,673 | Pearson et al. | May 23, 1944 |
| 2,380,640 | Eskin | July 31, 1945 |
| 2,619,566 | Mahoney | Nov. 25, 1952 |

FOREIGN PATENTS

| | | |
|---|---|---|
| 413,619 | Great Britain | Oct. 11, 1932 |